(12) United States Patent
Oberheide et al.

(10) Patent No.: US 9,607,156 B2
(45) Date of Patent: Mar. 28, 2017

(54) SYSTEM AND METHOD FOR PATCHING A DEVICE THROUGH EXPLOITATION

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 14/188,492

(22) Filed: Feb. 24, 2014

(65) Prior Publication Data

US 2014/0245450 A1 Aug. 28, 2014

Related U.S. Application Data

(60) Provisional application No. 61/768,256, filed on Feb. 22, 2013.

(51) Int. Cl.
*G06F 21/57* (2013.01)
*H04L 29/06* (2006.01)

(52) U.S. Cl.
CPC ........ *G06F 21/577* (2013.01); *H04L 63/1433* (2013.01)

(58) Field of Classification Search
CPC ........ G06F 21/10; G06F 11/00; G06F 21/577; H04L 9/00
USPC .............................................. 713/201; 726/25
See application file for complete search history.

(56) References Cited

U.S. PATENT DOCUMENTS

| | | |
|---|---|---|
| 5,838,792 A | 11/1998 | Ganesan |
| 5,870,723 A | 2/1999 | Pare et al. |
| 6,119,096 A | 9/2000 | Mann et al. |
| 6,209,091 B1 | 3/2001 | Sudia et al. |
| 6,311,272 B1 | 10/2001 | Gressel |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 6,996,716 B1 | 2/2006 | Hsu |
| 7,096,354 B2 | 8/2006 | Wheeler et al. |
| 7,331,518 B2 | 2/2008 | Rable |
| 7,340,600 B1 | 3/2008 | Corella |
| 7,447,784 B2 | 11/2008 | Eun |
| 7,496,662 B1 | 2/2009 | Roesch et al. |
| 7,526,792 B2 | 4/2009 | Ross |
| 7,562,382 B2 | 7/2009 | Hinton et al. |

(Continued)

OTHER PUBLICATIONS

Symantec, Administration Guide for Symantec TM Endpoint Protection and Symantec Network Access Control, Aug. 1, 2007.*

(Continued)

*Primary Examiner* — Harunur Rashid
*Assistant Examiner* — Thanh Le
(74) *Attorney, Agent, or Firm* — Jeffrey Schox; Padowithz Alce

(57) ABSTRACT

A system and method that includes identifying a vulnerability in a computing device; accessing a vulnerability exploitation mapped to the identified vulnerability; at the computing device, executing the vulnerability exploitation and entering an operating mode of escalated privileges; and while in the operating mode of escalated privileges, updating the system with a vulnerability resolution.

19 Claims, 8 Drawing Sheets

(56) References Cited

U.S. PATENT DOCUMENTS

| | | |
|---|---|---|
| 7,574,733 B2 | 8/2009 | Woodhill |
| 7,711,122 B2 | 5/2010 | Allen et al. |
| 7,793,110 B2 | 9/2010 | Durfee et al. |
| 7,953,979 B2 | 5/2011 | Borneman et al. |
| 7,982,595 B2 | 7/2011 | Hanna et al. |
| 8,028,329 B2 | 9/2011 | Whitcomb |
| 8,136,148 B1 | 3/2012 | Chayanam et al. |
| 8,161,527 B2 | 4/2012 | Curren |
| 8,200,980 B1 | 6/2012 | Robinson et al. |
| 8,245,044 B2 | 8/2012 | Kang |
| 8,332,627 B1 | 12/2012 | Matthews et al. |
| 8,335,933 B2 | 12/2012 | Humphrey et al. |
| 8,397,301 B2 | 3/2013 | Hering et al. |
| 8,458,798 B2 | 6/2013 | Williams et al. |
| 8,499,339 B2* | 7/2013 | Chao et al. .................. 726/5 |
| 8,510,820 B2 | 8/2013 | Oberheide et al. |
| 8,538,028 B2 | 9/2013 | Yeap et al. |
| 8,539,567 B1 | 9/2013 | Logue et al. |
| 8,627,438 B1 | 1/2014 | Bhimanaik |
| 8,646,060 B1 | 2/2014 | Ayed |
| 8,646,086 B2 | 2/2014 | Chakra et al. |
| 8,689,287 B2 | 4/2014 | Bohmer et al. |
| 8,700,729 B2 | 4/2014 | Dua |
| 8,732,475 B2 | 5/2014 | Fahrny et al. |
| 8,732,839 B2* | 5/2014 | Hohl .............................. 726/25 |
| 8,745,703 B2* | 6/2014 | Lambert ............... G06F 21/554 726/5 |
| 8,763,077 B2 | 6/2014 | Oberheide et al. |
| 8,806,609 B2 | 8/2014 | Gladstone et al. |
| 2,639,997 A1 | 9/2014 | Wiesmaier et al. |
| 8,850,516 B1 | 9/2014 | Hrebicek et al. |
| 8,893,230 B2 | 11/2014 | Oberheide et al. |
| 8,898,762 B2 | 11/2014 | Kang |
| 9,223,961 B1 | 12/2015 | Sokolov |
| 9,282,085 B2 | 3/2016 | Oberheide et al. |
| 9,391,980 B1 | 7/2016 | Krahn et al. |
| 2002/0013898 A1 | 1/2002 | Sudia et al. |
| 2002/0123967 A1 | 9/2002 | Wang |
| 2002/0136410 A1 | 9/2002 | Hanna |
| 2003/0061506 A1 | 3/2003 | Cooper et al. |
| 2003/0115452 A1 | 6/2003 | Sandhu et al. |
| 2003/0120931 A1 | 6/2003 | Hopkins et al. |
| 2003/0126472 A1* | 7/2003 | Banzhof ..................... 713/201 |
| 2003/0147536 A1 | 8/2003 | Andivahis et al. |
| 2004/0064706 A1 | 4/2004 | Lin et al. |
| 2004/0218763 A1 | 11/2004 | Rose et al. |
| 2005/0218215 A1 | 10/2005 | Lauden |
| 2005/0221268 A1 | 10/2005 | Chaar et al. |
| 2005/0240522 A1 | 10/2005 | Kranzley et al. |
| 2005/0268107 A1 | 12/2005 | Harris et al. |
| 2006/0031938 A1 | 2/2006 | Choi |
| 2006/0059569 A1 | 3/2006 | Dasgupta et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0184788 A1 | 8/2006 | Sandhu et al. |
| 2006/0242692 A1 | 10/2006 | Thione et al. |
| 2007/0016948 A1 | 1/2007 | Dubrovsky et al. |
| 2007/0081667 A1 | 4/2007 | Hwang |
| 2007/0156659 A1 | 7/2007 | Lim |
| 2007/0186106 A1 | 8/2007 | Ting et al. |
| 2007/0199060 A1* | 8/2007 | Touboul ........................ 726/11 |
| 2007/0228148 A1 | 10/2007 | Rable |
| 2007/0250914 A1 | 10/2007 | Fazal |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0049642 A1 | 2/2008 | Gudipudi et al. |
| 2008/0069347 A1 | 3/2008 | Brown et al. |
| 2008/0120411 A1 | 5/2008 | Eberle |
| 2008/0229104 A1 | 9/2008 | Ju et al. |
| 2009/0055906 A1 | 2/2009 | Wendorff |
| 2009/0077060 A1 | 3/2009 | Sermersheim et al. |
| 2009/0167489 A1 | 7/2009 | Nan et al. |
| 2009/0187986 A1 | 7/2009 | Ozeki |
| 2009/0198997 A1 | 8/2009 | Yeap et al. |
| 2009/0210705 A1 | 8/2009 | Chen |
| 2009/0271863 A1 | 10/2009 | Govindavajhala et al. |
| 2009/0300596 A1 | 12/2009 | Tyhurst et al. |
| 2009/0300707 A1 | 12/2009 | Garimella et al. |
| 2010/0023781 A1 | 1/2010 | Nakamoto |
| 2010/0042954 A1 | 2/2010 | Rosenblatt et al. |
| 2010/0069104 A1 | 3/2010 | Neil et al. |
| 2010/0100725 A1 | 4/2010 | Ozzie et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |
| 2010/0131755 A1 | 5/2010 | Zhu et al. |
| 2010/0180001 A1 | 7/2010 | Hardt |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0274859 A1 | 10/2010 | Bucuk |
| 2010/0330969 A1 | 12/2010 | Kim et al. |
| 2011/0026716 A1 | 2/2011 | Tang et al. |
| 2011/0086616 A1 | 4/2011 | Brand et al. |
| 2011/0107389 A1 | 5/2011 | Chakarapani |
| 2011/0113484 A1 | 5/2011 | Zeuthen |
| 2011/0119765 A1 | 5/2011 | Hering et al. |
| 2011/0138469 A1* | 6/2011 | Ye et al. ...................... 726/25 |
| 2011/0145900 A1 | 6/2011 | Chern |
| 2011/0197267 A1 | 8/2011 | Gravel et al. |
| 2011/0219449 A1* | 9/2011 | St. Neitzel et al. ............ 726/23 |
| 2011/0277025 A1 | 11/2011 | Counterman |
| 2011/0302410 A1 | 12/2011 | Clarke et al. |
| 2011/0302630 A1 | 12/2011 | Nair et al. |
| 2012/0063601 A1 | 3/2012 | Hart |
| 2012/0090028 A1 | 4/2012 | Lapsley et al. |
| 2012/0096274 A1 | 4/2012 | Campagna et al. |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0290841 A1 | 11/2012 | Jentzsch |
| 2012/0300931 A1 | 11/2012 | Ollikainen et al. |
| 2013/0042002 A1 | 2/2013 | Cheeniyil et al. |
| 2013/0060708 A1 | 3/2013 | Oskolkov et al. |
| 2013/0081101 A1 | 3/2013 | Baer et al. |
| 2013/0097585 A1 | 4/2013 | Jentsch et al. |
| 2013/0110676 A1 | 5/2013 | Kobres |
| 2013/0117826 A1 | 5/2013 | Gordon et al. |
| 2013/0124292 A1 | 5/2013 | Juthani |
| 2013/0174246 A1* | 7/2013 | Schrecker et al. ............. 726/14 |
| 2013/0179815 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0246281 A1 | 9/2013 | Yamada et al. |
| 2013/0263211 A1 | 10/2013 | Neuman et al. |
| 2013/0310006 A1 | 11/2013 | Chen et al. |
| 2013/0326224 A1 | 12/2013 | Yavuz |
| 2013/0326493 A1 | 12/2013 | Poonamalli et al. |
| 2014/0019752 A1 | 1/2014 | Yin et al. |
| 2014/0047546 A1* | 2/2014 | Sidagni ......................... 726/25 |
| 2014/0181517 A1 | 6/2014 | Alaranta et al. |
| 2014/0181520 A1 | 6/2014 | Wendling et al. |
| 2014/0188796 A1 | 7/2014 | Fushman et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0351954 A1 | 11/2014 | Brownell et al. |
| 2014/0376543 A1 | 12/2014 | Malatack et al. |
| 2015/0012914 A1 | 1/2015 | Klein et al. |
| 2015/0026461 A1 | 1/2015 | Devi |
| 2015/0237026 A1 | 8/2015 | Kumar |

(56) References Cited

U.S. PATENT DOCUMENTS

2015/0242643 A1 8/2015 Hankins et al.
2016/0056962 A1 2/2016 Mehtala
2016/0164866 A1 6/2016 Oberheide et al.
2016/0180072 A1 6/2016 Ligatti et al.
2016/0286391 A1 9/2016 Khan

OTHER PUBLICATIONS

Symantec, Administration guide for symantec Endpoint protection and symantec network access control, 2009, verision 11.00.05.00.00.*

Simske et al., "APEX: Automated Policy Enforcement eXchange", Sep. 21-24, 2010, ACM, pp. 139-142.

Goldfeder et al., Securing Bitcoin wallets via a new DSA/ECDSA threshold signature scheme, http://www.cs.princeton.edu/~stevenag/threshold_sigs.pdf.

Edge, Kenneth, et al. "The use of attack and protection trees to analyze security for an online banking system." System Sciences, 2007. HICSS 2007. 40th Annual Hawaii International Conference on. IEEE, 2007.

Neuenhofen, Kay, and Mathew Thompson. "A secure marketplace for mobile java agents." Proceeding of the second international Conference on Autonomous agents. ACM, 1998. (pp. 212-218).

* cited by examiner

SYSTEM AND METHOD FOR PATCHING A DEVICE THROUGH EXPLOITATION

CROSS-REFERENCE TO RELATED APPLICATIONS

This application claims the benefit of U.S. Provisional Application Ser. No. 61/768,256, filed on 22 Feb. 2013, which is incorporated in its entirety by this reference.

TECHNICAL FIELD

This invention relates generally to the digital device security field, and more specifically to a new and useful portable card display in the digital device security field.

BACKGROUND

Many parties control the software underlying a modern mobile device. For a mobile operating system, there may be a main maintainer of the operating system, but a device may include different packages, drivers, and customizations from carriers, manufacturers, and other third parties. Additionally, various open source components used in the operating system are also owned and maintained by various entities. When a vulnerability (defined as a flaw or weakness in a system's design, implementation, or operation and management that could be exploited to violate the system's security policy) is discovered for any given part of a device, the ecosystem for fixing the vulnerability is so complicated that the process can be extremely slow and, in some cases, the vulnerability is never addressed. Thus, there is a need in the mobile security field to create a new and useful system and method for patching a device through exploitation. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Patching a Device Through Exploitation

Figure 1:
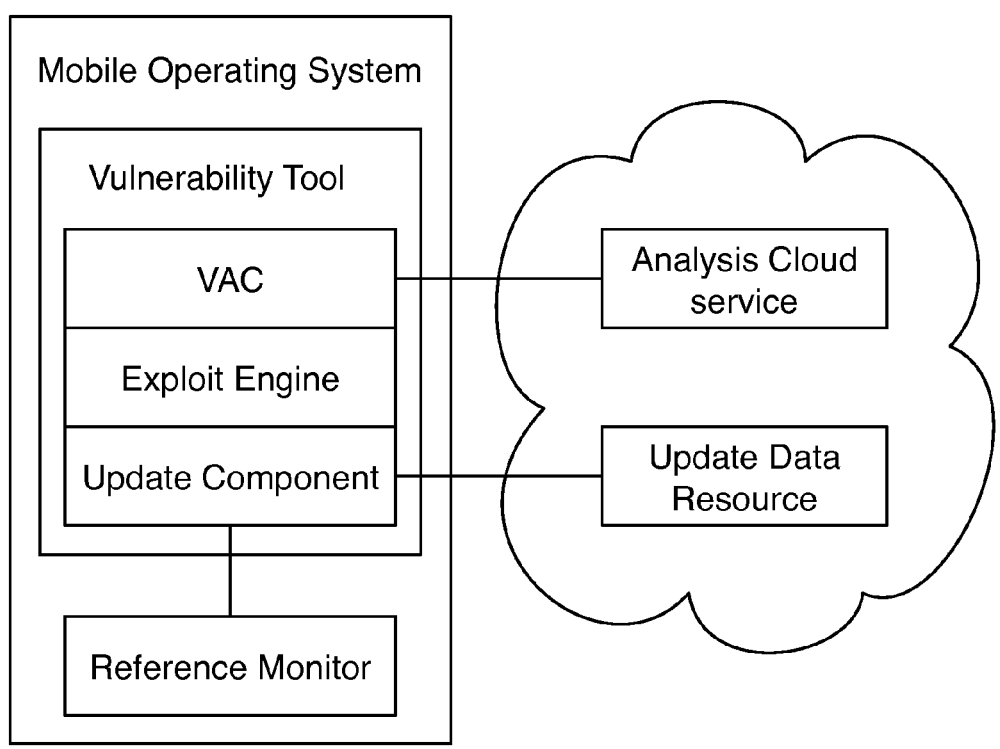
FIG. 1 is schematic representation of system of a preferred embodiment.

As shown in FIG. 1, a system for patching a device through exploitation of a preferred embodiment can include a vulnerability tool with a vulnerability assessment component, an exploit engine, and an update component. The system is preferably used to enable capabilities to fix, update, and/or reduce the vulnerabilities of a system. The system can be employed to apply a persistent fix on a computing system but can alternatively be used in maintaining a patched state through a non-persistent computing system patch. The system is preferably used in an operating system that may be characterized as one in which known vulnerabilities are known and known fixes to the vulnerabilities are known, but due to disorganization and lack of incentives, the parties with the privileges to correct such issues do not. Mobile computing systems such as smart phones, tablets, wearable computing devices, open-source hardware systems, vehicular computing systems, and the like are exemplary computing systems where multiple parties are involved. Hardware providers, OS providers, carriers and numerous other parties involved in such multi-party devices are exemplary environments that can employ the use of the system. The components of the system preferably cooperatively identify vulnerabilities and exploit such vulnerabilities to enable capabilities to fix the vulnerabilities. The vulnerability tool can be communicatively coupled to an analysis service and an update data resource. The system can be used in various situations. In one preferred implementation, the system is implemented through a security application that a user of a device selectively downloads and uses. In another preferred implementation, a company can integrate the system as a service on all enterprise managed devices. The system is preferably employed in situations where necessary privileges to update the system are not present or do not facilitate customized and/or accelerated patching of a device The vulnerability tool functions as a service or application that can identify and resolve vulnerabilities on a device. The vulnerability tool is preferably an application of a mobile device, which may have a closed and complicated ecosystem that prevents speedy resolution of device vulnerabilities. The vulnerability tool may alternatively be any suitable application or service operable on a device system. The vulnerability tool is preferably downloaded as a third party application on a device. The vulnerability tool may be downloaded in response to a request or purchase by a user/owner of a device. The vulnerability tool may alternatively be automatically deployed by an enterprise or service provider, embedded via an SDK of an existing application, provided in the existing software loadset by an OEM/carrier or other entity, or provided in any suitable manner. The user preferably activates the vulnerability detection capabilities of the application; the user is informed of identified vulnerabilities on a device; and then the user is presented with the option of patching or fixing the vulnerabilities. The vulnerability tool can alternatively or additionally operate in the background. Following installation or initialization of the vulnerability tool, the vulnerability tool can continuously or periodically identify and resolve vulnerabilities on the device. The vulnerability tool then uses a method substantially similar to the one described below to resolve or reduce the vulnerability or vulnerabilities of the device by leveraging the existing vulnerabilities on the device.

The vulnerability assessment component (VAC) of a preferred embodiment functions to facilitate the identification of device vulnerabilities. The VAC may use any suitable approach to identifying a vulnerability. In one preferred embodiment, the VAC cooperates with a remote analysis service to identify vulnerabilities. The VAC is preferably a module, routine, process, or other component of the vulnerability tool that collects software objects to be assessed and transmits vulnerability assessment requests to the analysis cloud service. The VAC additionally can receive the vulnerability assessments and, depending on the application, present the vulnerability assessment result to a user, provide the assessment to an application, automatically initiate patching a vulnerability, or take any suitable action. As many vulnerability assessment techniques may be computationally heavyweight, the VAC preferably off-loads these tasks to the analysis cloud service. The VAC may alternatively implement any suitable additional or alternative techniques to identify a vulnerability such as anti-virus and/or malware detection approaches as would be known by those skilled in the art.

One preferred embodiment may include an analysis cloud service, which functions to remotely analyze and assess the vulnerability of a plurality of mobile devices that utilize the service. The analysis cloud service is preferably a network-based service. The analysis cloud service is preferably a software component running on a server that is accessible to the mobile device via the network. Such a network may be public or private in nature, and the analysis cloud service may communicate with the VAC using any variety of protocols using any type of network interface deemed appropriate. The analysis cloud service is preferably configured to scale within a cloud-computing environment to meet large volumes of vulnerability requests. The analysis cloud service is tasked with receiving vulnerability assessment requests from a VAC, using the information in the request to identify vulnerabilities using one of its analysis engines, and returning the result back to the VAC over the network or through any suitable means. The analysis cloud service may additionally include a vulnerability storage system to facilitate the detection and analysis of vulnerability in a plurality of devices. A system of the preferred embodiment may alternatively implement the functionality of the analysis locally on a device. A local analysis engine can function substantially similar. Vulnerability updates can be transferred to the local analysis engine to maintain an update record of vulnerabilities. A local analysis engine can perform analysis on a more regular basis due to the lack of network communication required. Additionally, raw information may be more readily inspected locally. A hybrid approach employing a local and cloud analysis engine can additionally be leveraged, depending on different contexts or modes of operation.

The exploit engine of a preferred embodiment functions to execute an exploitation process. The exploit engine preferably uses at least one of the vulnerabilities identified by the VAC to grant the vulnerability tool heightened permissions within the operating system. The heightened permissions within the operating system preferably include arbitrary privileged code execution. In achieving arbitrary privileged code execution, the capability can be leveraged to install a reference monitor by the update component. The exploit engine may alternatively use any suitable approach to enable the vulnerability tool to gain the capability to apply an update that would otherwise be prohibited by third parties. The exploit engine may access a resource storing a collection of exploitation scripts or routines. An exploitation routine preferably targets at least one vulnerability, more preferably a vulnerability identified by the analysis engine. In one alternative embodiment, the exploit engine may systematically attempt various exploits and test if the exploit succeeded, which would circumvent the process of analyzing and predicting vulnerabilities.

The update component of a preferred embodiment functions to apply a patch or system update to resolve or reduce an existing vulnerability. The update component is preferably engaged or initiated upon the vulnerability tool entering an escalated privileges mode and/or a backdoor privilege mode. The escalated privileges mode and/or backdoor privilege mode can be enabled by the exploit engine or through an established reference monitor previously established. The update component will preferably retrieve or access the necessary resources to implement an update within the system. The update component may retrieve the patch data file from an update data resource such as one remotely hosted along with the analysis cloud service or other suitable location. In one preferred embodiment, the update component may include a reference monitor update routine to create or modify a reference monitor. The augmented reference monitor preferably serves as a mechanism to invoke a backdoor privilege mode. The reference monitor may be used as an alternative mechanism to grant the vulnerability tool enhanced capabilities in the operating system. The backdoor privilege mode can be invoked for patching subsequent updates without exploiting a second vulnerability. The reference monitor is preferably a mechanism that enforces an access control policy over subjects' ability to perform operations on objects within the system such that the update component can perform subsequent updates. The reference monitor is preferably secured so that only the update component and/or other suitable components of the system can use the reference monitor to acquire desired privileges to execute an update.

2. Method for Patching a Device Through Exploitation

Figure 2:
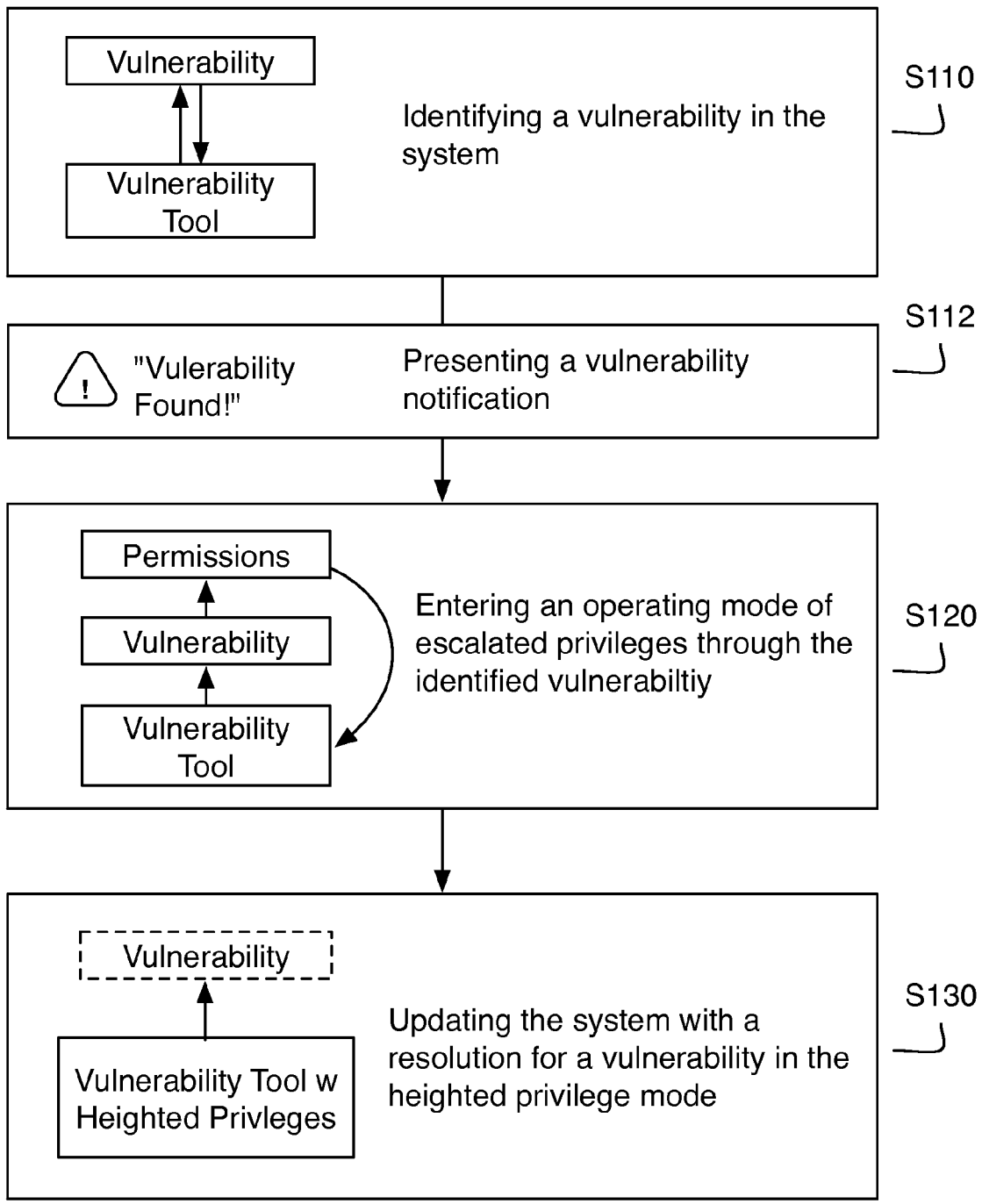
FIG. 2 is a graphical flowchart representation of a method of a preferred embodiment.

As shown in FIG. 2, a method for patching a device through exploitation of a preferred embodiment can include identifying a vulnerability in a system S110; entering an operating mode of escalated privileges through the identified vulnerability S120; and while in the escalated privileges mode, updating the system with a vulnerability resolution S130. The method functions to enable outside entities to update or patch a closed system to resolve a vulnerability. The closed system is preferably a computing device (e.g., a mobile phone, a tablet, a wearable computing device, a home automation computing system, a smart device, a gaming system, a home entertainment system, and the like) in a closed system administration ecosystem, where patching a system is managed by a limited set of parties. In some situations, a device may have an existing vulnerability of which a solution is known (i.e., a patch exists), but due to logistical issues, the patch or solution is not obtainable from the device owner. The logistical issue may arise from a party with the necessary privileges (e.g., a carrier) not acting. Thus, an implementer of the method of a preferred embodiment can circumvent patching restrictions by exploiting a vulnerability in order to resolve or mitigate the vulnerability. The method is preferably implemented by vulnerability tool of mobile computing device or other suitable device as described above and may additionally use and access analysis, exploitation instructions and patching resources from within the vulnerability tool or hosted remotely.

Step S110, which includes identifying a vulnerability in a system, functions to find at least one vulnerability or weakness on the device. Preferably, vulnerabilities are identified for an entire system, but the vulnerabilities may alternatively be a set of vulnerabilities for a particular component or set of components of a device such as for a service or an application within an operating system of a computing device. Preferably the checked system is a mobile operating system. Alternatively, the checked system may be a particular application (e.g., a browser, communication framework, or any suitable component). Identifying vulnerability preferably includes using and processing a vulnerability assessment request in a remote analysis cloud service as is described in U.S. patent application Ser. No. 13/601,409, filed 31 Aug. 2012, which is hereby incorporated in its entirety by this reference. The method preferably includes collecting data object identifiers of the inspected system. Data objects identifiers can include version numbers and type identifiers of system components (e.g., software versions, hardware model identifiers, file names, application names, and the like). The vulnerability analysis may alternatively be performed and implemented on the device without accessing an analysis cloud service. Preferably, identifying a vulnerability includes disassembling executable code into native machine code and detecting unpatched vulnerabilities. For example, a file such as the volume manager file may be disassembled into its native machine code and analyzed to determine whether a known vulnerability, such as the gingerbreak vulnerability for Android devices, has been patched. Code analysis routines can preferably be developed and deployed to an analysis cloud service at any suitable time, which enables the analysis cloud service to provide current vulnerability assessment to all devices at the time of their vulnerability assessment. Alternatively or additionally, identifying a vulnerability may include querying a map of object identifiers to vulnerability assessments. Querying a map of object identifiers to vulnerability assessments can include collecting data object identifiers and searching for vulnerabilities mapped to the object identifiers. The object identifiers can be a version number, a product/application name, a file name, executable code excerpts, or any suitable object identifier. The object identifier can additionally be a combination of object identifiers such as a first software version number, a file name, and a device model number may be used as a single object identifier for a vulnerability that targets that particular device configuration. For example, the version number of software may have been included as the object identifier, and that object identifier may be used to look up a known vulnerability assessment. More preferably, a cryptographic hash of a code segment may be used to query a storage system for an assessment previously calculated for the code segment. The analysis cloud service preferably includes a combination of approaches to identify a vulnerability. Identifying a vulnerability may additionally or alternatively include various anti-virus and malware approaches as would be known by those skilled in the art.

Figure 4:
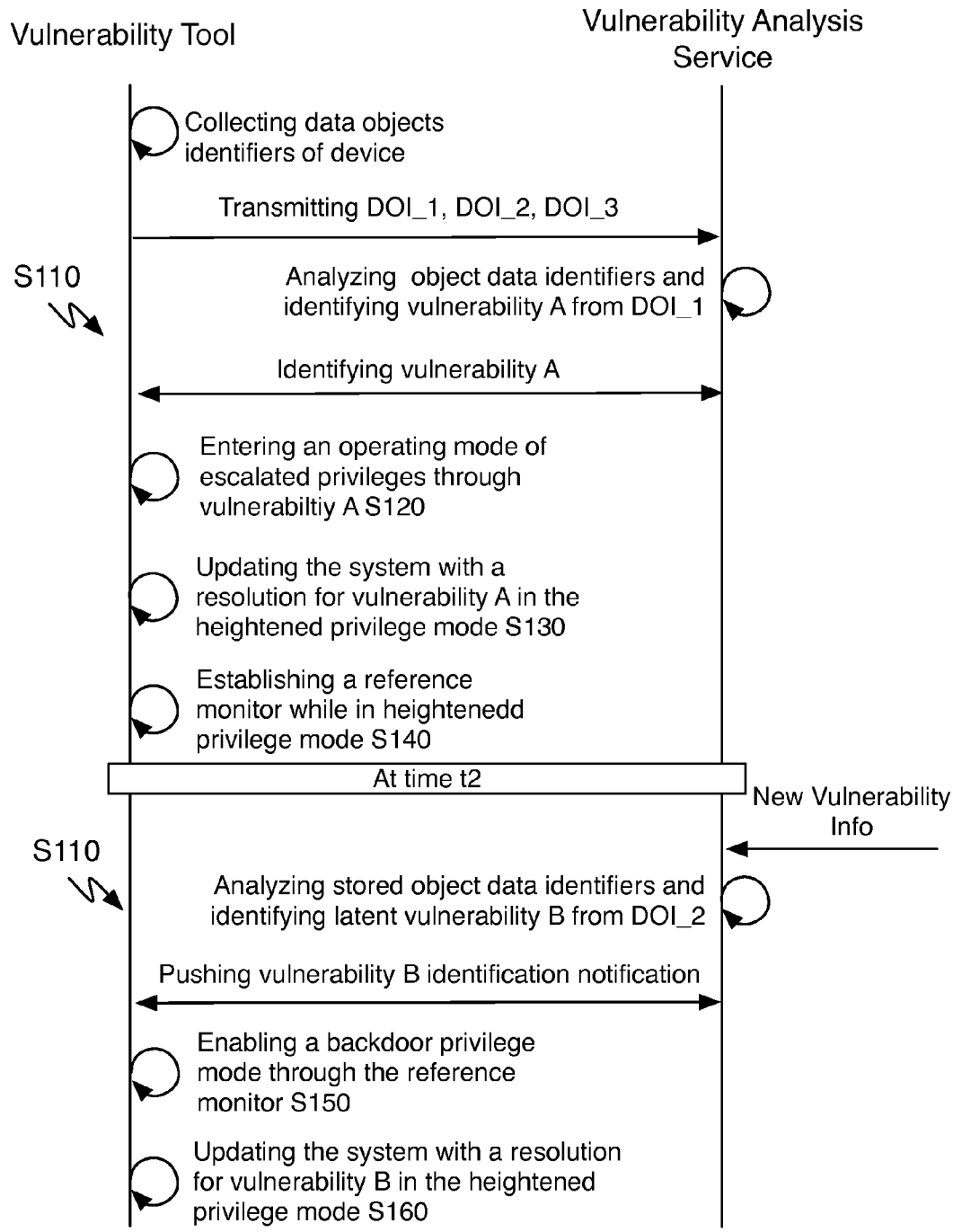
FIG. 4 is a sequence diagram representing n exemplary implementation of a method of a preferred embodiment.

The vulnerability can assessment can be completed locally at the device, but the vulnerability assessment can alternatively be completed remotely such as within a vulnerability assessment cloud service as shown in FIG. 4. Identifying a vulnerability in a system can include transmitting a data object identifier to a remote vulnerability assessment service and receiving a vulnerability assessment that identifies at least one vulnerability of the computing device. The vulnerability assessment cloud service can use information from multiple users and can quickly distribute new vulnerability assessment information. Additionally, vulnerability assessments can retroactively be applied. For example, a device may submit an object identifier. At the time of submission, a vulnerability may not exist or be known, and no vulnerability is identified. The object identifier is preferably stored as an object identifier record and associated with the particular device. At a later time, a vulnerability may be discovered that maps to that object identifier. Action can then be taken based on stored object identifier, which functions to simplify the collection of object identifiers for a device. The method can include identifying a vulnerability in a system from an object identifier record, and at the device asynchronously receiving at least one vulnerability assessment that identifies at latent vulnerability. Here asynchronous describes that the submission or collection of the information characterizing the vulnerability (e.g., the data object identifier or more specifically the executable code sample) is collected at a time substantially earlier time (e.g., days, weeks, or weeks prior to identifying the vulnerability). Latent similarly describes the nature of the vulnerability being present in the system (which may have been previously scanned) but not identified. Object identifier records can be processed and queried whenever a new vulnerability to object identifier is added to the system. If a vulnerability is detected for an object identifier, the associated device or devices can be messaged, notified, triggered, or otherwise prompted to initiate vulnerability patching.

The identified vulnerabilities are preferably those that can be exploited for escalated privileges so that the system may be patched in Steps S120 and S130. In one example implementation, the method may be applied to a vulnerability tool for Android operating system wherein an analysis engine may include algorithms and heuristics to identify privilege escalation vulnerabilities due to allowing a device to be rooted (e.g., ASHMEM vulnerability), neglecting to check if messages are from a trusted source (e.g., Exploid or Gingerbreak vulnerability), privilege levitating (e.g., Levitator vulnerability), writing to arbitrary memory address space (e.g., Mempodroid vulnerability), overwhelming a system with command arguments (e.g., Android ZergRush vulnerability), neglecting to check return values enabling root shells (e.g., Zimperlich vulnerability), and/or any suitable vulnerability or exploits. As vulnerabilities are constantly changing as new ones are found, and new ones introduced. The set of identifiable vulnerabilities is preferably periodically updated.

Figure 5:
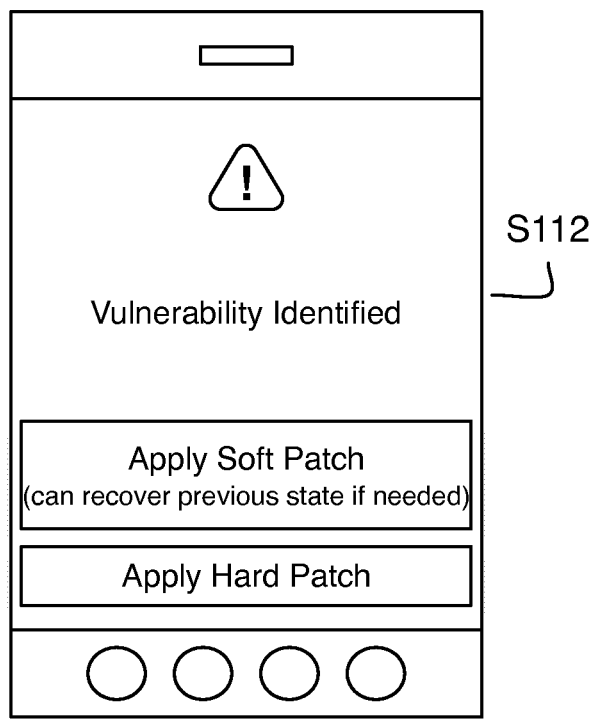
FIG. 5 is a schematic representation of an exemplary screenshot of presenting the presence of the identified vulnerability.

The method can additionally include presenting the presence of the identified vulnerability S112, which functions to inform, alert, record, or track the vulnerabilities that have been detected and that are, will be, or can be addressed. The alerting of the presence of the identified vulnerability can be applied to informing a user, notifying an administrator, notifying involved parties, notifying other installed applications or services. In one variation, the identified vulnerabilities can be detected by a user-run application. The application can display a vulnerability summary view as shown in FIG. 5 or play a suitable vulnerability detection alert. In a related variation, the application can use a notification or messaging service of the device to alert the user such as if the application is a background application that is not commonly opened by the user. The vulnerability summary can include a count of summaries; an identifier of the vulnerability (e.g., a name or internal identifier); the services, applications, functionality and/or other aspects that are vulnerable; any known resolutions or options to patch the vulnerability through software updates; and/or any other suitable information. The vulnerability summary can additionally include selectable user interface options (e.g., buttons or selectable actions) that can be used to receive a request to apply a vulnerability resolution. The user interface options can additionally include an option to install a reference monitor. The user interface options can additionally include an option to provide device vulnerability data to an outside entity such as the vulnerability assessment cloud service. The vulnerability data can include anonymized vulnerability status of the device. The vulnerability data can be used in further improving vulnerability detection and assessment. The vulnerability data can additionally or alternatively be used in informing and prompting involved parties to take action. As mentioned above, other involved services or applications on the device may be programmatically notified. For example, some applications (e.g., a financial transaction based app) may register for the security status of the device such that privileges can be changed depending on the present vulnerabilities and/or the resolution/patching of vulnerabilities.

Figure 6:
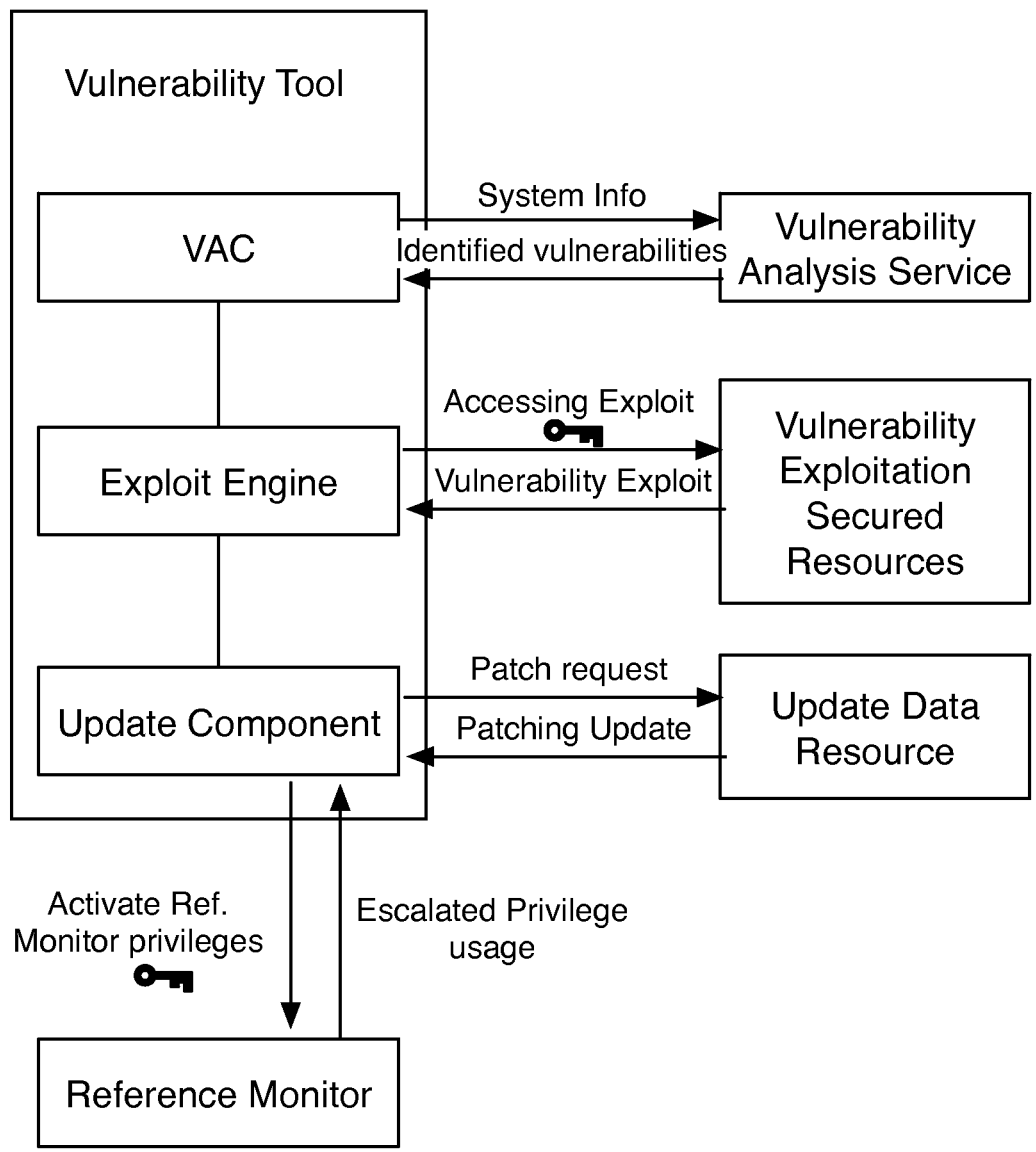
FIG. 6 is a schematic representation of stages of the method including accessing secured vulnerability exploits and securely engaging a reference monitor.

Step S120, which includes entering an operating mode of escalated privileges through the identified vulnerability, functions to benevolently leverage the vulnerability to enable necessary capabilities to fix or lessen the threat. Entering an operating mode of escalated privileges preferably includes selecting an appropriate vulnerability exploitation and executing the vulnerability exploitation. If a plurality of vulnerabilities were identified, the selected vulnerability for exploitation may be made based on the robustness, simplicity, enabled capabilities after the exploitation, or other properties of the exploit. For example, one vulnerability may only enable patching one particular vulnerability, but a second vulnerability may enable patching of multiple vulnerabilities and installing a reference monitor. In another variation, a plurality of vulnerabilities may be selected for combined exploitation. The process of exploitations may be characterized in exploit scripts of modules. The exploit modules may be cryptographically or suitably secured such that an exploit module is substantially limited to execution by the vulnerability tool—only authorized modules can preferably execute the exploit on the device. For example, only digitally signed requests by an authorized party may be limited to access the exploit module as shown in FIG. 6. Third parties or attackers could be prevented from abusing the system and tricking a device into executing malicious code. The process of the exploit module is preferably dependent for a given vulnerability. In addition to signing for integrity of the exploit modules, the exploit modules may additionally be encrypted to achieve confidentiality. The exploit modules can be correspondingly decrypted on the device (e.g., by a reference monitor).

The exploit preferably grants the vulnerability tool the necessary privileges to patch the vulnerability. The privileges are preferably escalated privileges such as those for a superuser, root account, system administrator, kernel level account, higher privileged services/drivers, privileges of another user/application/service, and/or other suitable modes of increased permissions within the device. Often these are system privileges that are reserved for carriers or manufacturers. The privileges may be based on the identified vulnerabilities. Depending on the vulnerability, different approaches may be taken. The privilege escalation is preferably a variety of vertical privilege escalation to obtain increased privileges. However, the privilege escalation may alternatively be horizontal to receive privileges of another application or other suitable component with the same level but different areas of privileges. Some exemplary exploits can include leveraging a buffer overflow vulnerability to perform arbitrary privileged code execution. In another example, the exploit uses application-level privilege escalation, which can include confused deputy exploits and collusion exploits. A confused deputy exploit leverages vulnerable interfaces of another privileged (but confused) application. Benign applications can be vulnerable to exploitation by exposing vulnerable interfaces. In some cases over-privileged benign applications can be used to obtain increased privileges. Collusion attacks can leverage and temporarily cooperate with malicious applications to combine permissions to allow, grant, or enable performing actions beyond respective individual privileges. Colluding application can communicate directly or exploit covert or overt channels in core system components.

Figure 7:
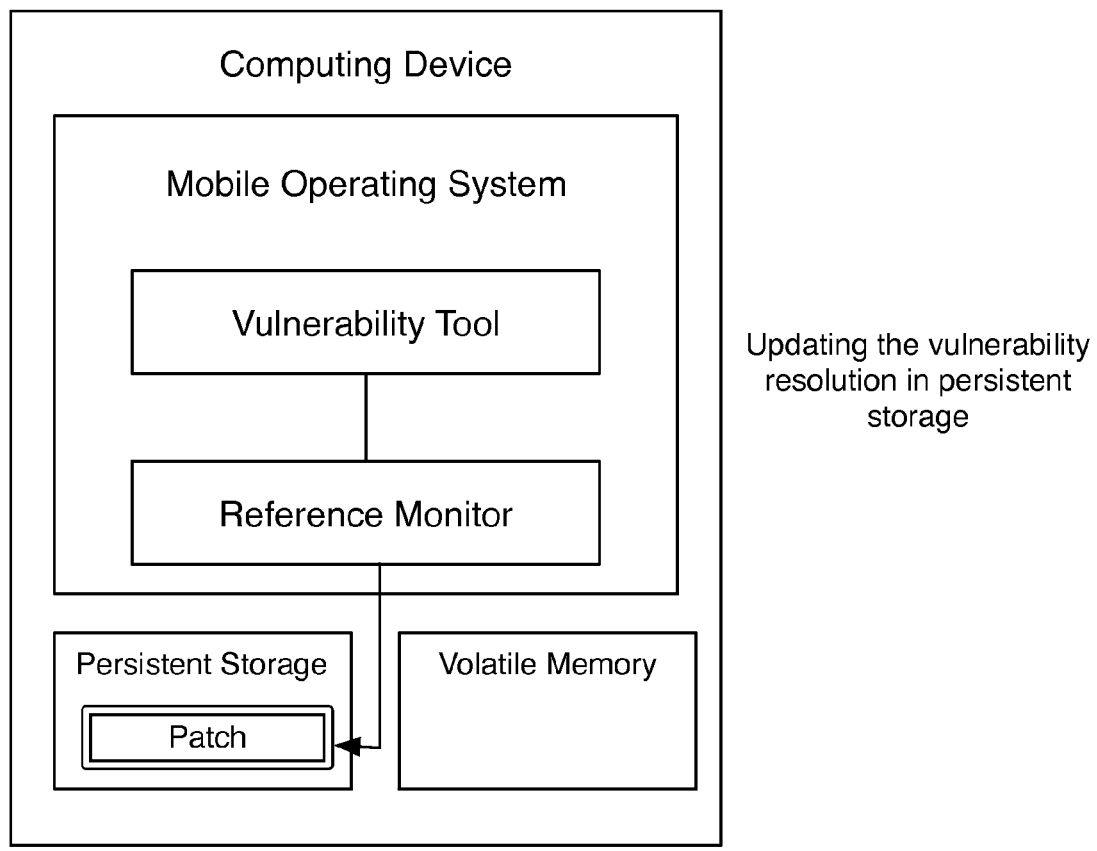
FIG. 7 is a schematic representation of updating the vulnerability resolution in persistent storage.
Figure 8:
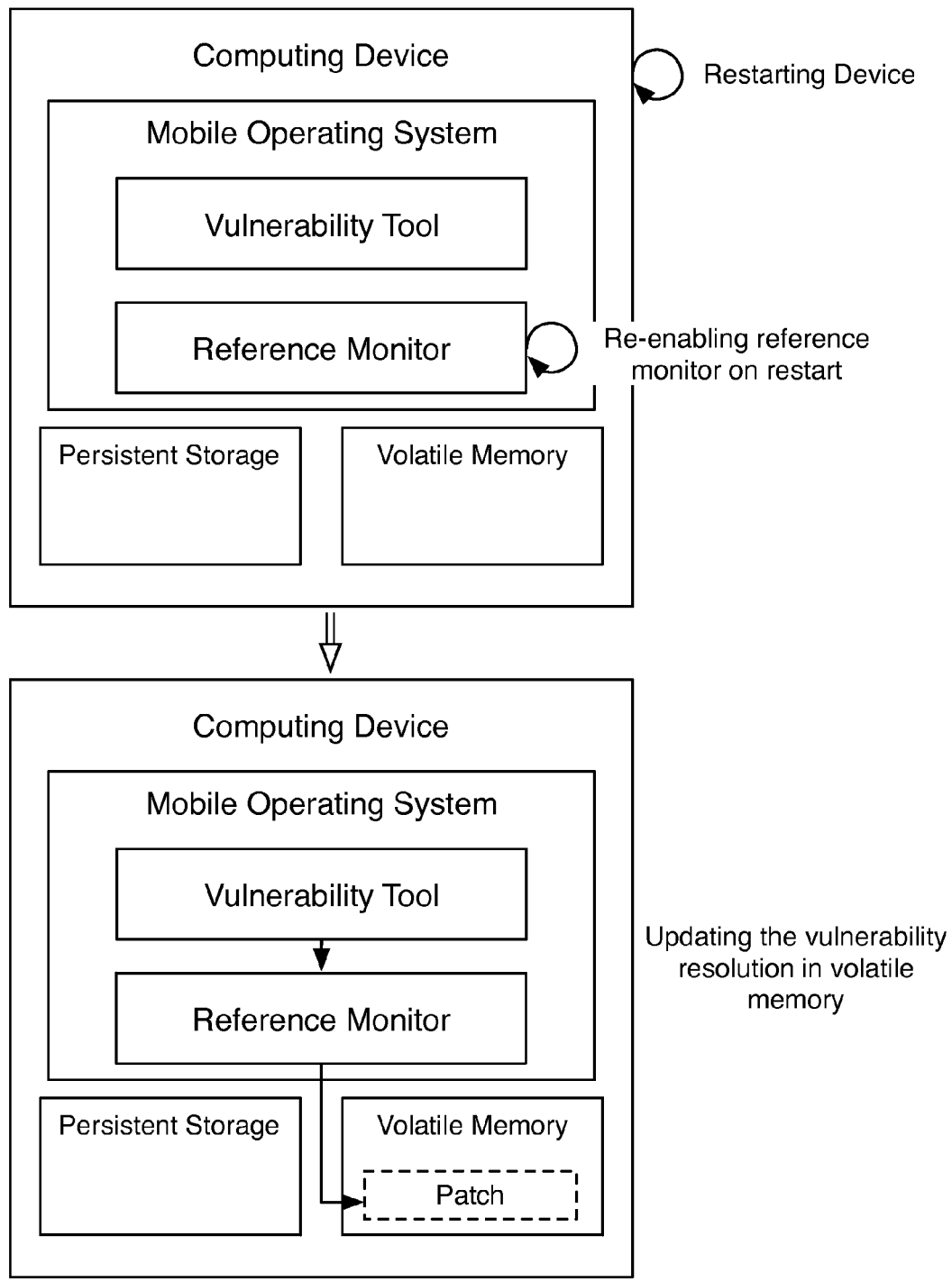
FIG. 8 is a schematic representation of updating the vulnerability resolution in volatile memory.

Step S130, which includes updating the system with a vulnerability resolution while in the escalated privileges mode, functions to use the privileges granted through the exploit to resolve or reduce vulnerabilities. Updating the system preferably includes downloading, accessing, and/or selecting a patch or software update that can be applied to the system. When an update is obtained, the patch can preferably be applied. The updating can target only the identified vulnerability; alternatively, updating may additionally install or update other system changes. Preferably at least the vulnerability that is exploited is patched. More than two patches may additionally be applied. If a plurality of vulnerabilities were identified in Step S110, the system can be updated with a patch for the plurality of vulnerabilities. In one implementation, the vulnerability tool (or a reference monitor or other related component) can patch the vulnerable software component in a persistent manner. For example, the vulnerability tool can write to a software library that is on a persistent disk/storage or non-volatile memory of the device as shown in FIG. 7. In other words, the vulnerability resolution is persistently applied in persistent storage of the device. In an alternative implementation, the vulnerability tool or other component can perform a soft patch, wherein the vulnerability tool can write a patch to system memory. Patching system memory (i.e., a soft patch) is preferably applied in non-persistent, volatile memory. The resolution is removed when the device enters a powered down state or the memory is overwritten (e.g., when a soft patched application is deallocated). Performing a soft patch may afford advantages in stability. For example, if a patch was applied improperly, restarting or reloading the application or device may recover the unpatched state. Additionally, the soft patch can be configured to preemptively patch or update vulnerabilities. For example a reference monitor can be configured to execute upon device boot to patch vulnerabilities in memory before potentially malicious code can run. A reference monitor can be configured to be initiated and engaged upon restarting or turning on the device, service, application, or other vulnerable component. The reference monitor can then apply a soft patch in substantially similar as previously performed as shown in FIG. 8. Alternatively a script or patching routine applies the patch upon restarting the device, service, or application, or other vulnerable component. Re-patching can additionally be controllable through application configuration. The reference monitor (or other suitable soft-patch initialization tool) can be selectively configured to re-patch one or all soft-patched vulnerabilities on the device on reboot, enabling the device to return to an original configuration. Additionally the application configuration can be applied to enable hard patch (i.e., patch in persistent memory) after the soft-patch has been verified to not conflict with normal operation.

Figure 3:
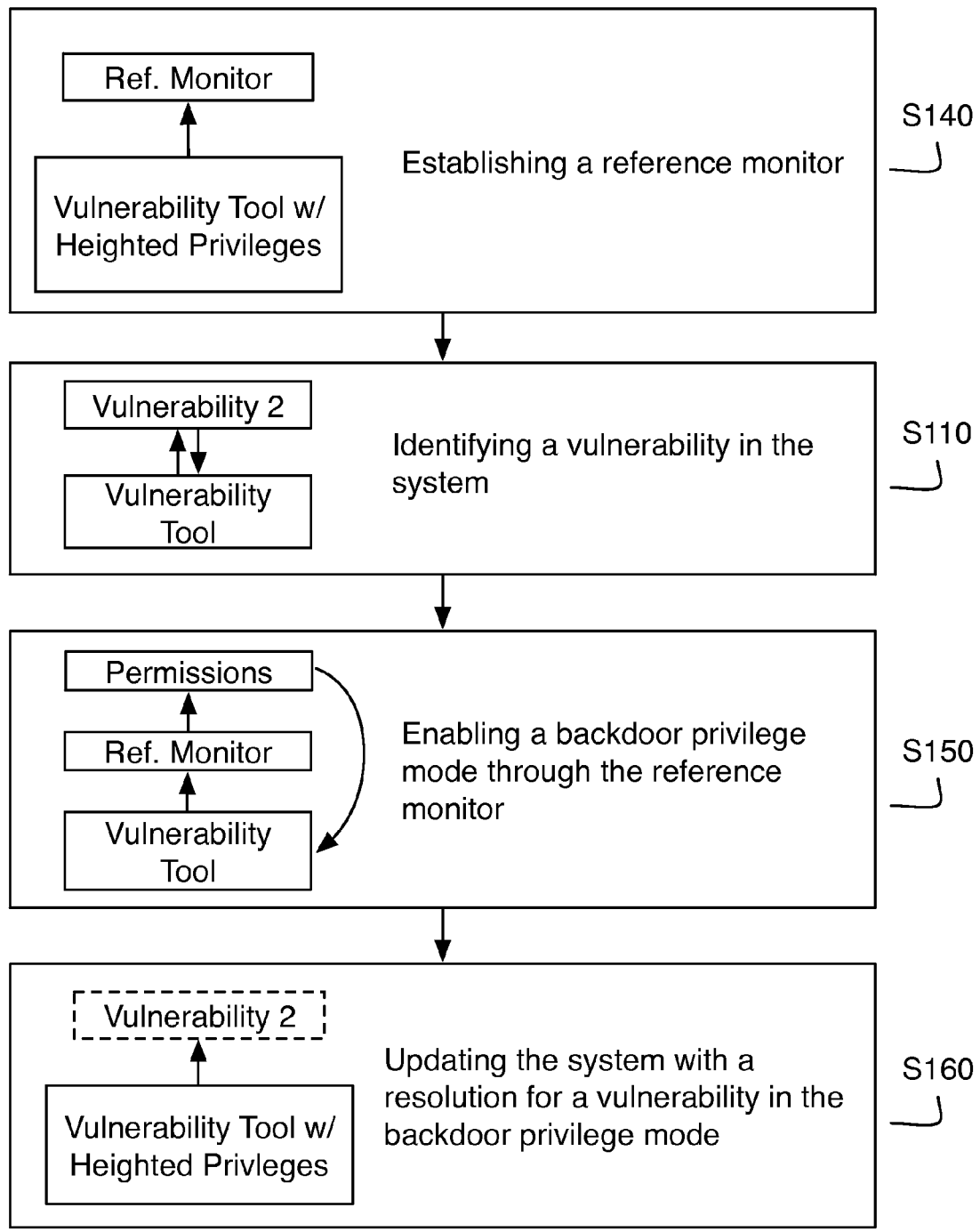
FIG. 3 is a graphical flowchart representation of a method of a variation of a preferred embodiment.

Additionally, the method of a preferred embodiment may include establishing a reference monitor S140; enabling a backdoor privilege mode through the reference monitor S150; and updating the system with a resolution for at least a second exploitation while in the backdoor privilege mode S160 as shown in FIG. 3. The use of a reference monitor preferably functions to establish an access channel to apply subsequent updates to the system. The use of the reference monitor backdoor further functions to enable the vulnerability tool to patch or substantially reduce the vulnerability that was exploited to enable the patching, while ensuring that the vulnerability tool maintains a way to supply subsequent updates. When a reference monitor is established, the vulnerability tool can apply updates even for a vulnerability without a suitable exploit (e.g., cannot be used to heighten privileges). The vulnerability can enable the backdoor privilege mode using the reference monitor in place of executing an exploit.

Step S140, which includes establishing a reference monitor S140, functions to update the system with backdoor access to administer system updates. The reference monitor preferably impacts the reference validation mechanism of the system, which enforces an access control policy over subjects ability to perform read, write and other operations within the system. A reference validation mechanism of the reference monitor is preferably always invoked, which can avoid bypassing the security policy. The reference validation is preferably tamper proof. The reference monitor is preferably configured to allow the vulnerability tool to have the necessary operational permissions to subsequently update the system. In one variation, this would include granting the vulnerability tool system permissions similar to those that would be invoked by a carrier or other controlling entity. Alternatively, the reference monitor may be updated with a latent backdoor mechanism that can be securely activated by the vulnerability tool. Preferably, the reference monitor is not exposed to vulnerabilities by outside entities and is only accessible by the vulnerability tool. For example, a reference monitor may be configured to only accept instructions that are digitally signed by an authorized party, which functions to ensure that unauthorized parties are not able to invoke it in a malicious way. In an alternative embodiment, the vulnerability may establish an alternative form of backdoor in addition to or as an alternative to a reference monitor. For example a static key or password may be used to grant access to the reference monitor or any suitable proof of authentication.

Step S150, which includes enabling a backdoor privilege mode through the reference monitor, functions to use the heightened/escalated privileges afforded by the established reference monitor. The backdoor privileges are preferably heighted privileges. As mentioned above, the backdoor privilege mode may be inherently enabled through the establishment of the reference monitor. For example, augmenting a reference monitor may grant the vulnerability tool a constant state of heightened privileges. Alternatively, the vulnerability tool may have to enable an established mechanism to grant heightened privileges. The heightened privileges can be sustained for at least the time duration used to complete updating the system with a resolution for at least a one exploitation. The enabling of backdoor privileges preferably escalates privileges such as changing privileges of the vulnerability tool to those for a superuser, root account, system administrator, kernel level account, higher privileged services/drivers, privileges of another user/application/service, and/or other suitable modes of increased permissions within the device. The reference monitor is preferably secured so that only the vulnerability tool or other suitable system component can access and enable the heightened privilege mode. The backdoor privilege mode is preferably used when detecting a subsequent vulnerability. For example, a first vulnerability is detected at time t1; the first vulnerability is patched and a reference monitor is set up; a second vulnerability is detected at time t2, where t2 comes after t1; the established reference monitor is used to invoke heightened privileges without executing an exploit; and the second vulnerability is patched. The detection of the second vulnerability can happen for a vulnerability of a set of vulnerabilities detected with the first vulnerability, during a second local scan of new data objects of the device, scanning for latent vulnerability in data object records using new vulnerability information, or in response to any patching prompt.

Step S160, which includes updating the system with a resolution for at least a second exploitation while in the backdoor privilege mode, functions to use the privileges granted through the exploit to resolve or reduce vulnerabilities. Step S160 is preferably substantially similar to Step S130. However, the resolution for at least a second exploitation can be made without entering an operating mode of escalated privileges through the second exploitation (though that variation may alternatively be used if the required privileges cannot be obtained other than through the second exploitation). Instead, escalated privileges are preferably granted through enabling escalated privileges through the reference monitor. Alternatively, escalated privileges can be granted through a backdoor of a previously resolved vulnerability. In any case one of the above variations is used to escalate privileges such that a vulnerability resolution can be installed, patched, or otherwise enabled. The method can additionally include exiting the operating mode of escalated privileges. After the vulnerability is completed, the reference monitor backdoor may be eliminated or updated to secure access for a subsequent use. For example, the heightened privileges of the backdoor privilege mode are removed and returned to normal operating privileges. The backdoor privileges can be reactivated at a later time when an update or other suitable action is necessitated. Additionally, the reference monitor can itself be removed such that that mechanism can no longer be used. If a reference monitor is removed, subsequent identified vulnerabilities can be resolved through executing a corresponding exploit of the vulnerability and/or establishing a second reference monitor as described above.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the vulnerability tool. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   identifying a vulnerability in a computing device;
   accessing a vulnerability exploitation mapped to the identified vulnerability, wherein the vulnerability exploitation comprises pre-identified computer-executable scripts or routines specifically provided to target the identified vulnerability in the computing device to thereby resolve or reduce the identified vulnerability, wherein, once executed, the pre-identified computer-executable scripts or routines of the vulnerability exploitation automatically change an operating mode of the computing device from an operating mode with less privileges to an operating mode with increased privileges;

at the computing device, executing the pre-identified scripts or routines of the vulnerability exploitation and, through execution of the pre-identified scripts or routines of the vulnerability exploitation causing an entering into an operating mode of escalated privileges within the computing device; and while in the operating mode of escalated privileges, updating the computing device with a vulnerability resolution that functions to automatically use the escalated privileges to resolve or reduce the identified vulnerability.

2. The method of claim 1, wherein identifying the vulnerability in the computing device comprises: (i) collecting data object identifiers of one or more components of the computing device; and (ii) querying, using each of the collected data object identifiers, a map of object identifiers mapped to known vulnerability assessments for the object identifiers thereby searching for vulnerabilities mapped to the collected data object identifiers.

3. The method of claim 1, further comprising presenting the presence of the identified vulnerability.

4. The method of claim 1, wherein accessing the vulnerability exploit comprises digitally signing a request to access a cryptographically secured vulnerability exploit.

5. The method of claim 1, wherein updating the computing device with a vulnerability resolution comprises persistently applying the vulnerability resolution on the computing device.

6. The method of claim 1, wherein updating the computing device with a vulnerability resolution comprises applying the vulnerability resolution on the computing device in non-persistent memory; and further comprising reactivating the vulnerability resolution on the device in the non-persistent memory during restart of the computing device.

7. The method of claim 1, further comprising while in the operating mode of escalated privileges, establishing a reference monitor; and further comprising identifying a second vulnerability in a computing device; entering an operating mode of backdoor escalated privileges through the reference monitor; and while in the operating mode of backdoor escalated privileges, updating the computing device with a vulnerability resolution of the second vulnerability.

8. The method of claim 1, wherein more than one vulnerability is identified; and wherein updating the computing device with a vulnerability resolution comprises updating the computing device with a vulnerability resolution for more than one vulnerability.

9. The method of claim 1, wherein identifying a vulnerability in a computing device further comprises collecting data object identifiers of the computing device, transmitting the data object identifiers to a remote vulnerability assessment cloud service; and receiving a vulnerability assessment that identifies at least one vulnerability of the computing device.

10. The method of claim 9, wherein receiving a vulnerability assessment that identifies at least one latent vulnerability of the computing device occurs asynchronously to the transmitting the data object identifiers.

11. A method comprising:
identifying a first vulnerability in a system;
exploiting the first vulnerability using a pre-identified set of escalated code execution privileges mapped to the first vulnerability, wherein the set of escalated execution privileges are accessible through the first vulnerability for the purpose of resolving or reducing the first vulnerability;
establishing a reference monitor during the escalated code execution privileges;
identifying a second vulnerability in the system;
entering an operating mode of escalated privileges through the reference monitor on the system, wherein the escalated privileges of the operating mode are different than the set of escalated execution privileges mapped to the first vulnerability; and
while in the operating mode of escalated privileges, updating the system with a vulnerability resolution of the second vulnerability.

12. The method of claim 11, wherein exploiting the first vulnerability comprises digitally signing a request to access a cryptographically secured vulnerability exploit of the first vulnerability and receiving the granting escalated code execution privileges through executing the cryptographically secured vulnerability exploit.

13. The method of claim 11, wherein entering an operating mode of escalated privileges through the reference monitor comprises authenticating a vulnerability tool wherein the vulnerability tool completes updating the system with a vulnerability resolution of the second vulnerability.

14. The method of claim 11, further comprising presenting the presence of the identified vulnerability through a user interface of the system.

15. The method of claim 11, wherein updating the system with a vulnerability resolution comprises persistently applying the vulnerability resolution on the device.

16. The method of claim 11, wherein updating the system with a vulnerability resolution comprises applying the vulnerability resolution on the system in non-persistent memory; and further comprising upon refreshing the system, entering an operating mode of escalated privileges through the reference monitor and reactivating the vulnerability resolution on the device in the non-persistent memory.

17. The method of claim 11, wherein the vulnerability is a system level vulnerability.

18. The method of claim 11, wherein the vulnerability is an application level vulnerability.

19. A method for patching a computing device in a closed system administration ecosystem comprising:
collecting data object identifiers of the computing device at a first instance;
querying, using the collected data object identifiers, a map of object identifiers to vulnerabilities and identifying at least one vulnerability associated with at least one of the collected data object identifiers;
accessing a vulnerability exploitation mapped to the identified vulnerability, wherein the vulnerability exploitation comprises pre-identified computer-executable scripts or routines specifically provided to target the identified vulnerability in the computing device to thereby resolve or reduce the identified vulnerability, wherein, once executed, the pre-identified computer-executable scripts or routines of the vulnerability exploitation automatically change an operating mode of the computing device from an operating mode with less privileges to an operating mode with increased privileges;

at the computing device, executing the vulnerability exploitation and entering a first operating mode of escalated privileges through the vulnerability exploitation; and while in the first operating mode of escalated privileges, updating the computing device with a first vulnerability resolution of the at least one vulnerability and establishing a reference monitor;

collecting data object identifiers of the computing device at a second instance;

identifying a second vulnerability from the data object identifiers of the computing device at a second instance;

entering a second operating mode of backdoor escalated privileges through the reference monitor, wherein the second operating mode is different than the first operating mode; and while in the second operating mode of backdoor escalated privileges, updating the system with a second vulnerability resolution of the second vulnerability, wherein the second vulnerability resolution is different than the first vulnerability resolution.

* * * * *